(12) United States Patent
Li

(10) Patent No.: US 6,494,534 B1
(45) Date of Patent: Dec. 17, 2002

(54) BACKREST PAD HAVING COOLING AND SOUND PRODUCING ARRANGEMENT

(76) Inventor: Ming-Yen Li, No. 12, Lane 231, Kuang Jen Street, Pei-Tou Town, Changhua (TW)

( * ) Notice: Subject to any disclaimer, the term of this patent is extended or adjusted under 35 U.S.C. 154(b) by 0 days.

(21) Appl. No.: 10/014,544

(22) Filed: Dec. 14, 2001

(51) Int. Cl.[7] ............................................. A47C 31/00
(52) U.S. Cl. .............................. 297/217.4; 297/180.11; 297/452.41
(58) Field of Search ........................... 297/217.1, 217.3, 297/217.4, 217.5, 452.41, DIG. 3, 219.1, 180.1, 180.11, 180.15, 180.13; 5/666, 655.3, 654, 904

(56) References Cited

U.S. PATENT DOCUMENTS

| | | | | |
|---|---|---|---|---|
| 4,440,443 A | * | 4/1984 | Nordskog | |
| 4,991,222 A | * | 2/1991 | Nixdorf | |
| 5,179,747 A | * | 1/1993 | Zink | |
| 5,613,730 A | * | 3/1997 | Buie et al. | |
| 5,645,314 A | * | 7/1997 | Liou | |
| 5,819,346 A | * | 10/1998 | Lane | |
| 6,098,223 A | * | 8/2000 | Larson | |
| 6,135,551 A | * | 10/2000 | Linder | |

\* cited by examiner

*Primary Examiner*—Milton Nelson, Jr.
(74) *Attorney, Agent, or Firm*—Bacon & Thomas, PLLC

(57) ABSTRACT

A hollow backrest pad for a seat of motor vehicle comprises compartments, alternate channels each being in communication with adjacent compartments, an inlet port at one side of backrest pad in communication with one channel, a motor adjacent inlet port for pumping air into channel, a hollow cylindrical member below motor, a speaker within cylindrical member, a signal cord extended from cylindrical member to an external low-frequency which is in turn electrically coupled to a stereo system, an outlet port at other side of backrest pad in communication with another channel, and a relief valve in outlet port for reducing pressure of backrest pad. When stereo system is activated, signals are transmitted to speaker through low-frequency and signal cord for generating music. Simultaneously, cold air is introduced into backrest pad from an air conditioning of motor vehicle via inlet port by activated motor so as to generate a resonant effect by combining music with cold air.

1 Claim, 4 Drawing Sheets

FIG.2-A

BACKREST PAD HAVING COOLING AND SOUND PRODUCING ARRANGEMENT

FIELD OF THE INVENTION

The present invention relates to backrest pad of motor vehicle and more particularly to an improved backrest pad having cooling and sound producing arrangement.

BACKGROUND OF THE INVENTION

A conventional car stereo system can play stereo music for rider and/or passenger(s) to enjoy while driving. Another conventional car stereo system further equips with various speakers within a car so as to bring a high quality entertainment to rider and/or passenger(s) while driving. However, such provision inevitably requires to relish the interior of car, i.e, redesigning. This is disadvantageous because the whole electric system of car has to configure again resulting in a mess of the electric system. This is not safe. Thus, improvement exists.

SUMMARY OF THE INVENTION

It is therefore an object of the present invention to provide a hollow backrest pad for a seat of motor vehicle comprising a plurality of compartments, a plurality of alternate channels each being in communication with the adjacent compartments, an inlet port at one side of the backrest pad in communication with one of the channels, a motor in the channel adjacent the inlet port capable of pumping air into the channel, a hollow cylindrical member in the channel below the motor by a predetermined distance, a speaker within the cylindrical member, a signal cord extended from the cylindrical member to an external low-frequency which is in turn electrically coupled to a stereo system, an outlet port at the other side of the backrest pad in communication with another one of the channels, and a relief valve in the outlet port for releasing air so as to reduce an internal pressure of the backrest pad, wherein when the stereo system is activated, signals are transmitted to the speaker through the low-frequency and the signal cord for generating music and simultaneously cold air is introduced into the backrest pad from an air conditioning of the motor vehicle via the inlet port by the activated motor so as to generate a resonant effect by combining the music with the cold air.

The above and other objects, features and advantages of the present invention will become apparent from the following detailed description taken with the accompanying drawings.

BRIEF DESCRIPTION OF THE DRAWINGS

FIG. 2A perspective view of speaker of FIG. 2;

DETAILED DESCRIPTION OF THE EMBODIMENT

Figure 1:
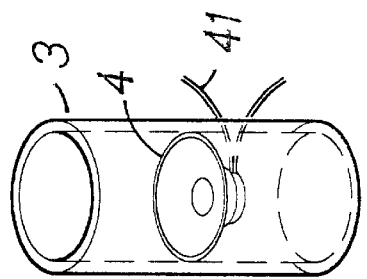
FIG. 1 shows a perspective view of a preferred embodiment of backrest pad according to the invention.
Figure 1:
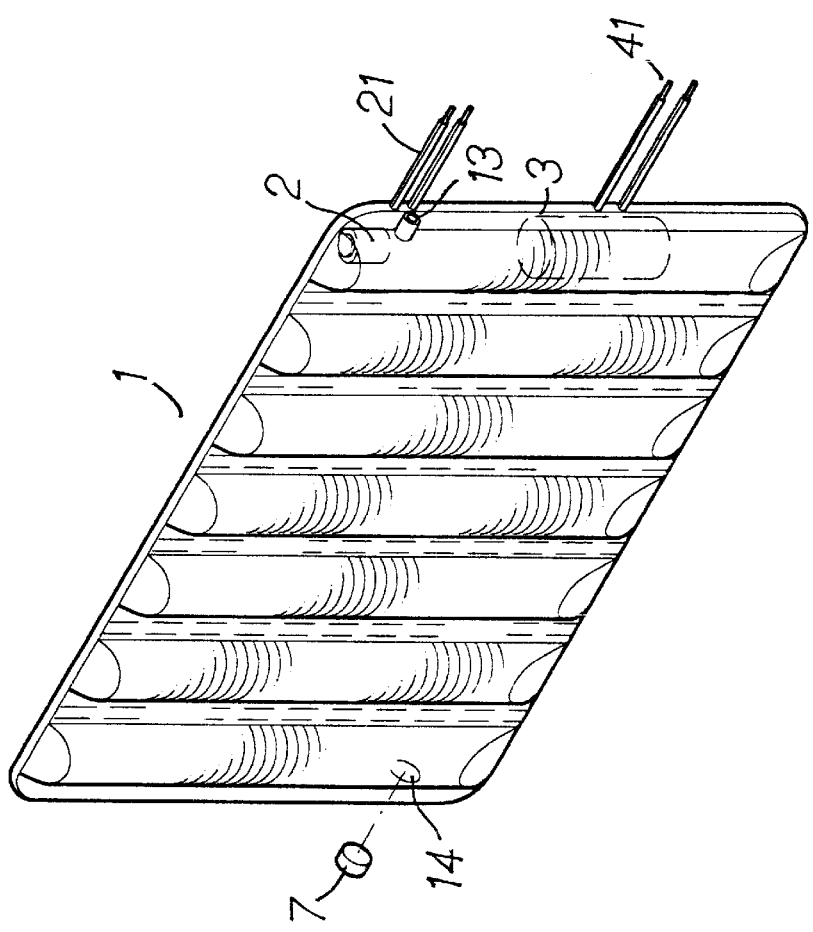
Figure 2:
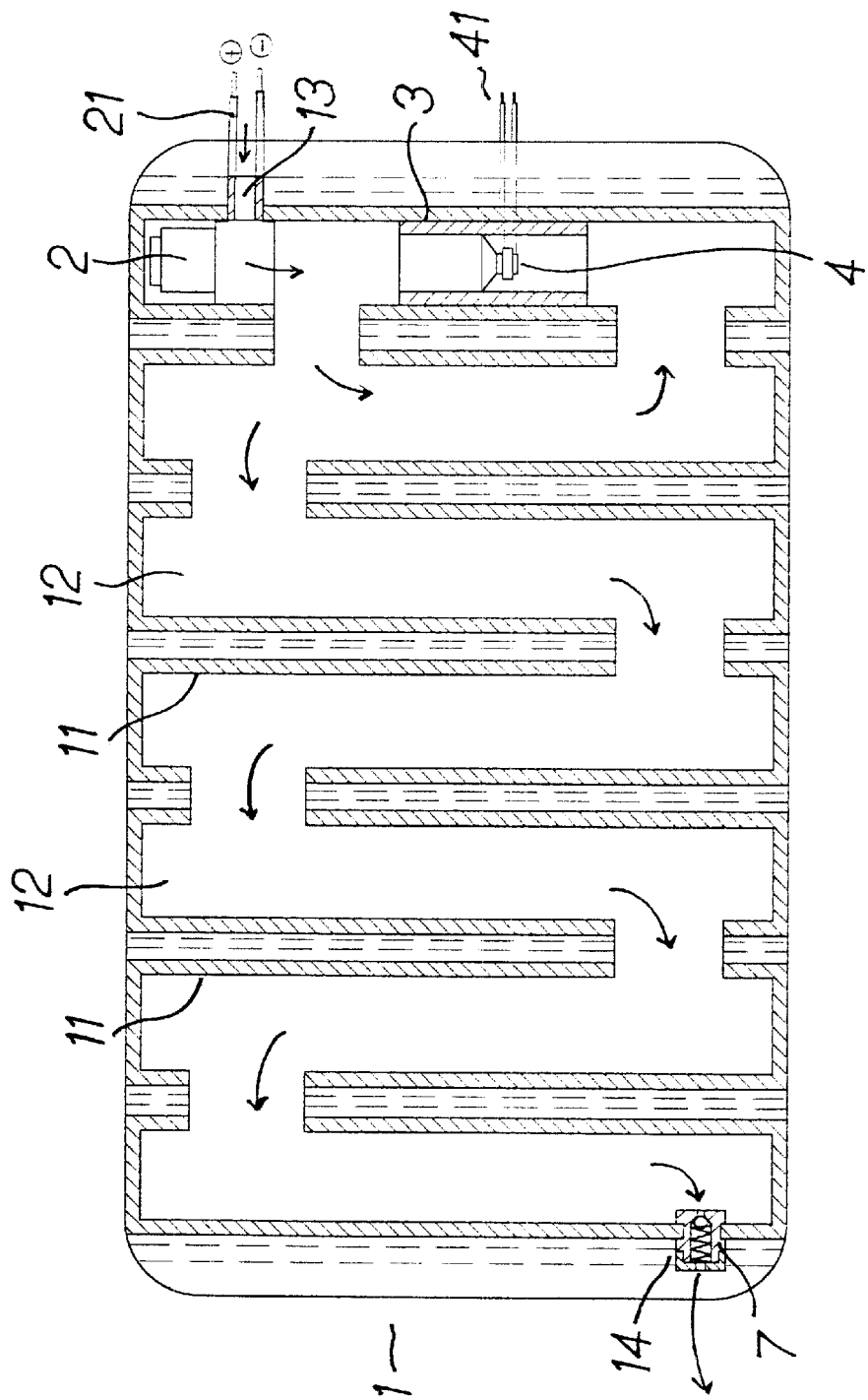
FIG. 2 shows a cross-sectional view of FIG. 1.
Figure 3:
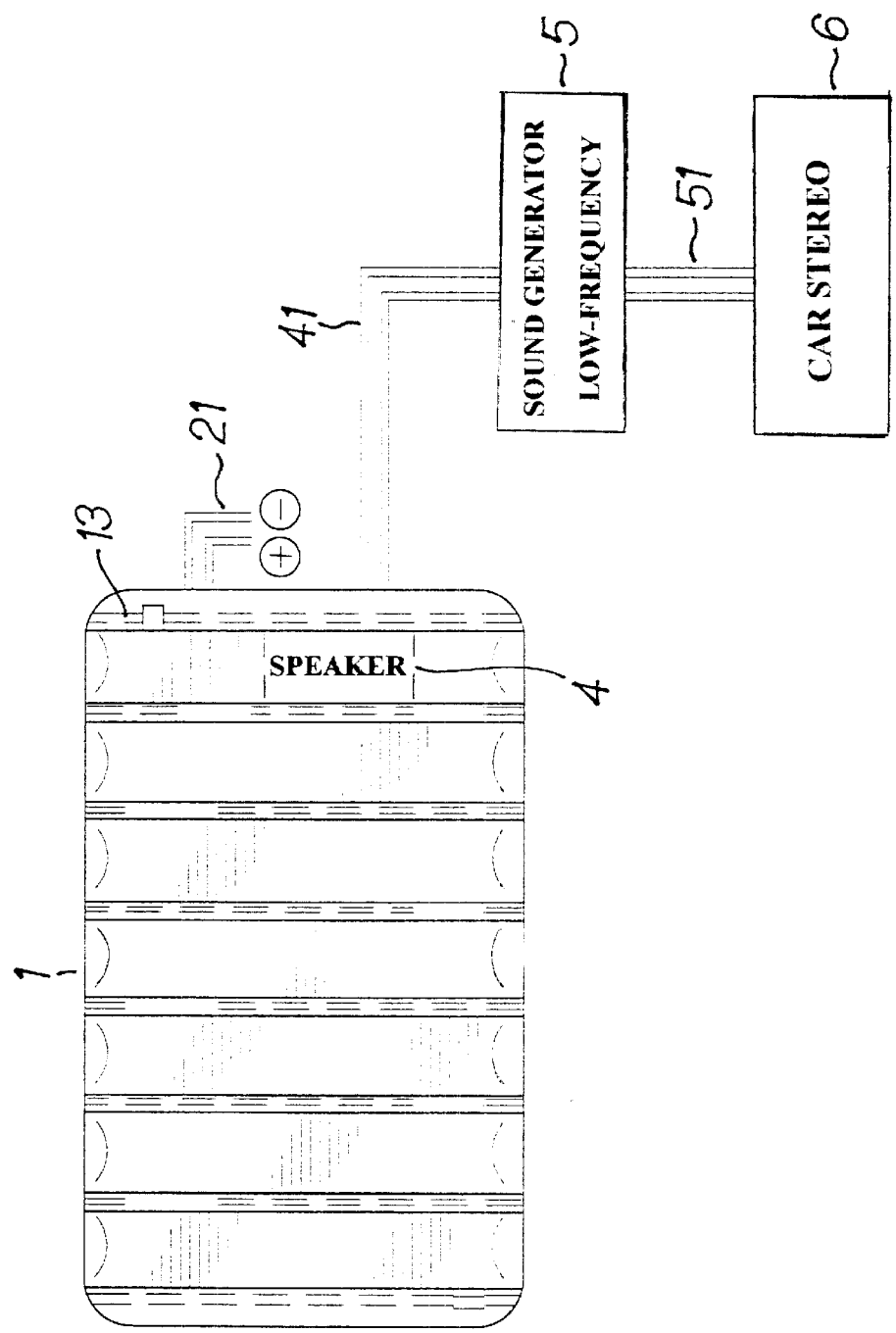
FIG. 3 shows a schematic view showing an electric connection of backrest pad and car stereo system.

Referring to FIGS. 1 to 3, there is shown a hollow backrest pad 1 constructed in accordance with the invention comprising a plurality of compartments 11, a plurality of alternate channels 12 each being in communication with two adjacent compartments 11, an inlet port 13 at one side of backrest pad 1 in communication with one channel 12, a motor 2 in the channel 12 adjacent inlet port 13 capable of pumping air into channel 12, a motor power cord 21 extended from motor 2 to an external power source (e.g. electric system of a motor vehicle), a hollow cylindrical member 3 in the channel 12 below motor 2 by a predetermined distance, a speaker 4 within the cylindrical member 3, a signal cord 41 extended from the cylindrical member 3 to an external low-frequency 5 which is in turn electrically coupled to a car stereo system 6, an outlet port 14 at the opposite side of backrest pad 1 in communication with another channel 12, and a relief valve 7 in outlet port 14 for releasing air so as to reduce internal pressure of backrest pad 1.

Figure 4:
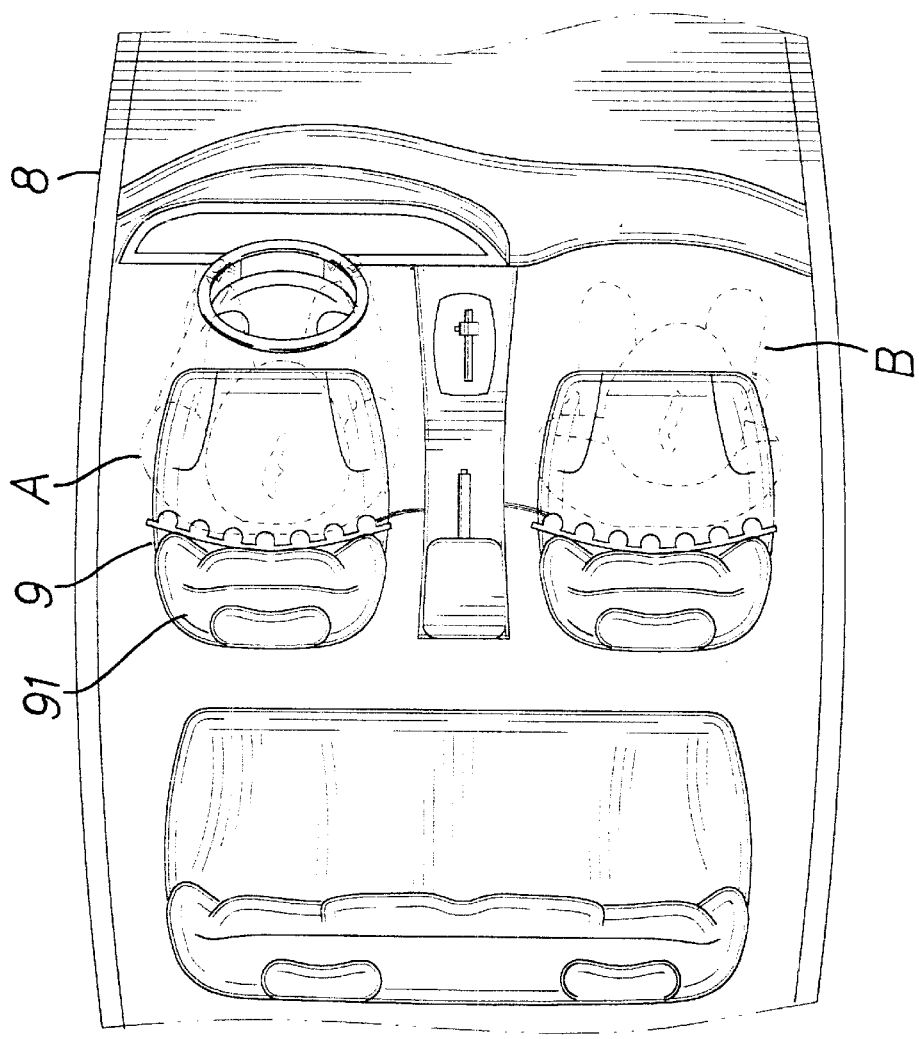
FIG. 4 shows top plan view showing backrest pads of the invention installed within a car.

Referring to FIG. 4, there is shown a preferred embodiment of the invention. Backrest pad is placed on backrest 91 of a seat 9 of a motor vehicle 8 having a rider A or passenger B seated thereon. When car stereo 6 is activated, signals are transmitted to speaker 4 through low-frequency 5 and signal cord 41. As a result, music is playing. At the same time, cold air is introduced into backrest pad 1 from air conditioning of motor vehicle 8 via inlet port 13 by the activated motor 2. It is important to note that such music has a resonant effect due to the combination with the introduced cold air. As a result, the quality of music is optimum. Further, a massage effect is carried out on the back of rider A or passenger B by the combination of music and cold air. Most importantly, by configuring as above, there is no need to redesign the electric system of motor vehicle. Hence, it is safe.

While the invention has been described by means of specific embodiments, numerous modifications and variations could be made thereto by those skilled in the air without departing from the scope and spirit of the invention set forth in the claims.

What is claimed is:

1. A hollow backrest pad for a seat of motor vehicle comprising a plurality of compartments, a plurality of alternate channels each being in communication with the adjacent compartments, an inlet port at one side of the backrest pad in communication with one of the channels, a motor in a channel adjacent the inlet port capable of pumping air into the channel, a hollow cylindrical member in the channel below the motor by a predetermined distance, a speaker within the cylindrical member, a signal cord extended from the cylindrical member to an external woofer which is in turn electrically coupled to a stereo system, an outlet port at the other side of the backrest pad in communication with another one of the channels, and a relief valve in the outlet port for releasing air so as to reduce an internal pressure of the backrest pad, wherein when the stereo system is activated, signals are transmitted to the speaker through the woofer and the signal cord for generating music and simultaneously cold air is introduced into the backrest pad from an air conditioning of the motor vehicle via the inlet port by the motor so as to generate a resonant effect by combining the music with the cold air.

* * * * *